United States Patent
De Jong

(10) Patent No.: US 8,388,785 B2
(45) Date of Patent: Mar. 5, 2013

(54) METHOD FOR REPAIRING AND/OR STRENGTHENING OF PIPES

(75) Inventor: Jeffrey Richard De Jong, Kuala Lumpur (MY)

(73) Assignee: Merit Technologies SDN BHD, Petaling Jaya (MY)

( * ) Notice: Subject to any disclaimer, the term of this patent is extended or adjusted under 35 U.S.C. 154(b) by 48 days.

(21) Appl. No.: 12/666,610

(22) PCT Filed: Jun. 24, 2008

(86) PCT No.: PCT/MY2008/000058
§ 371 (c)(1),
(2), (4) Date: Dec. 23, 2009

(87) PCT Pub. No.: WO2009/157748
PCT Pub. Date: Dec. 30, 2009

(65) Prior Publication Data
US 2010/0200149 A1    Aug. 12, 2010

(51) Int. Cl.
*B21C 37/12* (2006.01)

(52) U.S. Cl. ............ 156/98; 156/94; 156/195; 156/392; 72/135; 72/66; 72/142; 72/146; 72/147; 72/148; 493/152; 493/269; 493/299; 493/302; 29/435

(58) Field of Classification Search ............ 156/392, 156/98, 94, 195, 428; 72/135, 66, 142, 146, 72/147, 148; 493/152, 269, 299, 302; 29/435
See application file for complete search history.

(56) References Cited

U.S. PATENT DOCUMENTS

| | | | | |
|---|---|---|---|---|
| 2,924,546 A | * | 2/1960 | Shaw | 156/94 |
| 4,058,427 A | | 11/1977 | Wilson | |
| 4,061,513 A | | 12/1977 | Danielson | |
| 4,337,564 A | * | 7/1982 | Menzel et al. | 29/453 |
| 4,552,183 A | | 11/1985 | Chick | |
| 5,302,221 A | | 4/1994 | Golden | |
| 5,491,880 A | | 2/1996 | Labiche | |
| 7,168,743 B2 | | 1/2007 | Nadarajah et al. | |
| 2007/0018448 A1 | | 1/2007 | Nadarajah et al. | |
| 2008/0017263 A1 | | 1/2008 | Robinson et al. | |

FOREIGN PATENT DOCUMENTS

| | | | |
|---|---|---|---|
| EP | 0 136 048 | | 4/1985 |
| GB | 1 574 991 A | | 9/1980 |
| GB | 2 287 079 | | 9/1995 |
| GB | 2 317 935 A | | 4/1998 |
| GB | 2 393 229 | | 3/2004 |
| JP | 09280419 A | * | 10/1997 |

OTHER PUBLICATIONS

Supplementary European Search Report for European Application No. EP 08 87 4151, dated Feb. 24, 2012.

* cited by examiner

*Primary Examiner* — Jeff Aftergut
*Assistant Examiner* — Jaeyun Lee
(74) *Attorney, Agent, or Firm* — McCarter & English, LLP

(57) ABSTRACT

A method for effecting a repair and/or strengthening of a pipe. The method comprises cleaning an affected area of a surface of the pipe to provide a cleaned surface of the pipe surface for an area requiring repair; applying a continuous strip around the pipe from a portion prior to the effected area and allowing the continuous strip to extend to a portion after the affected area. The continuous strip forms a spiral sleeve spaced from the pipe surface to provide an annular chamber between the pipe surface and the spiral sleeve.

22 Claims, 9 Drawing Sheets

METHOD FOR REPAIRING AND/OR STRENGTHENING OF PIPES

CROSS-REFERENCE TO RELATED APPLICATIONS

This application is the U.S. National Phase of International Application No. PCT/MY2008/00058, entitled "Method for Repairing and/or Strengthening of Pipes," filed Jun. 24, 2008, the disclosure of which is hereby incorporated by reference in its entirety.

TECHNICAL FIELD

This invention relates to a method for repairing and/or strengthening of pipes and refers particularly, though not exclusively, to such a method applicable to pipes of differing diameters, and length of repair and/or strengthening.

BACKGROUND

U.S. Pat. No. 7,168,743 and U.S. patent application 2007/0018448 both disclose methods and apparatus for sealing terminal ends of pipe sleeves. The sleeves are used for the repairing of pipes and are generally made of metal. These pipes may be above ground or under water. In both US specifications there is disclosed the use of a sleeve 22 which is arranged to be placed surrounding the area of the pipe surface requiring repair. That means that the sleeves must be tailored to the pipes' diameter, and to the length of the pipe requiring repair. As such, a large range of sleeves are required for the range of varying pipe diameters that may be used. As the repair can be over various axial lengths of the pipe, the normal method is to fabricate sleeves required for each repair. In that way the sleeves can be tailored to the length required and also the diameter required. The design and fabrication of the sleeves can sometimes take months. In that period the pipeline may need to be closed down due to the risk of failure of the pipe. This can cause significant destruction. If the pipes were carrying, for example, oil, the results of a failure of the pipe could be significant environmental damage.

SUMMARY

According to an exemplary aspect there is provided a method for affecting a repair and/or strengthening of a pipe, the method comprises cleaning an effected area of a surface of the pipe to provide a cleaned surface of the pipe surface for an area requiring repair; applying a continuous strip around the pipe from a portion prior to the effected area and allowing the continuous strip to extend to a portion after the effected area. The continuous strip forms a spiral sleeve spaced from the pipe surface to provide an annular chamber between the pipe surface and the spiral sleeve.

The continuous strip may be a fibre reinforced, mechanically-sealing, polymer strip or a carbon-fibre reinforced HDPE strip.

The continuous strip may be formed into the spiral sleeve by at least one of: overlapping, and interlocking.

The annular chamber may be subsequently filled with a filling material for providing a bond between the pipe and the spiral sleeve. The filling material may be selected from the group consisting of: a structural resin, and a grout.

According to another exemplary aspect there is provided an apparatus for applying a continuous strip for providing repair to an affected surface area of a pipe. The apparatus comprises an application apparatus comprises at least two portions each having a plurality of rollers for guiding a continuous strip about and over the affected surface area of the pipe to form a spiral sleeve extending for at least the axial length of the affected area of the surface of the pipe; and a supply apparatus for attachment to at least one of the application apparatus portions. The supply apparatus comprises at least one driving roller for feeding the continuous strip into the at least one application apparatus portion.

Each of the at least two portions comprises a top plate and a bottom plate. There may be a plurality of generally equally spaced guides extending between the top plate and bottom plate.

At least one roller may be rotatably mounted on each of the plurality of guides adjacent a top end thereof.

The supply apparatus may further comprise a supply top plate and a supply bottom plate; and a plurality of drive and guide rods extending between the supply top plate and the supply bottom plate.

At least one of the rods may comprise rollers and may be adapted to be driven by a drive system.

The drive system may comprise a sprocket above supply top plate and securely attached to an upper end of the at least one of the rods for driving the at least one of the rods to a rotate about its longitudinal axis.

The drive system may be configured to drive the rods and rollers to enable the continuous strip to be fed through the supply apparatus into the at least two portions of the application apparatus.

BRIEF DESCRIPTION OF THE DRAWINGS

In order that the invention may be clearly understood and readily put into practical effect, there shall now be described by way of example only exemplary embodiments of the invention, the description being with reference to the accompanying illustrative drawings.

In the drawings.

DETAILED DESCRIPTION OF THE PREFERRED EMBODIMENTS

Figure 1:
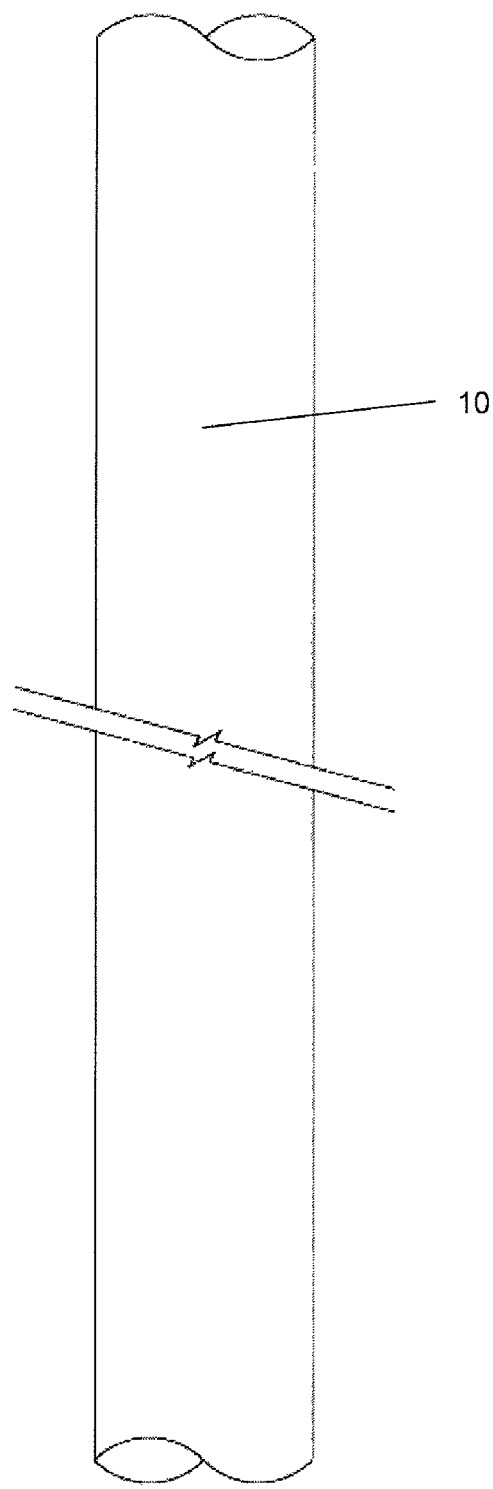
FIG. 1 is a front view of a damaged pipe.

As shown in FIG. 1 there is a pipe 10 in need of repair. The preliminary step of preparing the pipe 10 for repair is in accordance with the known techniques of abrasive or high pressure water blasting to remove rust and remainders of all coatings, to expose the bare metal on the surface of the pipe, and so forth. The abrasive blasting of the pipe 10 may be carried out by sweep blasting using fine blast not containing iron (for example, garnet, aluminium oxide and, copper slag), glass pearls or stainless steel shot. The maximum speed of cleaning and the most effective cleaning is obtained by systematic blasting. Work is blocked out in 30 cm squares and each square is blasted evenly until complete. A minimum of 25 mm into any adjacent coated area is continued by blasting and the edges are feathered.

Subject to the condition of the pipe 10, composite reinforcement extending longitudinally of the pipe may be placed at a pre-determined spacing around the outer surface of the pipe 10.

Figure 2:
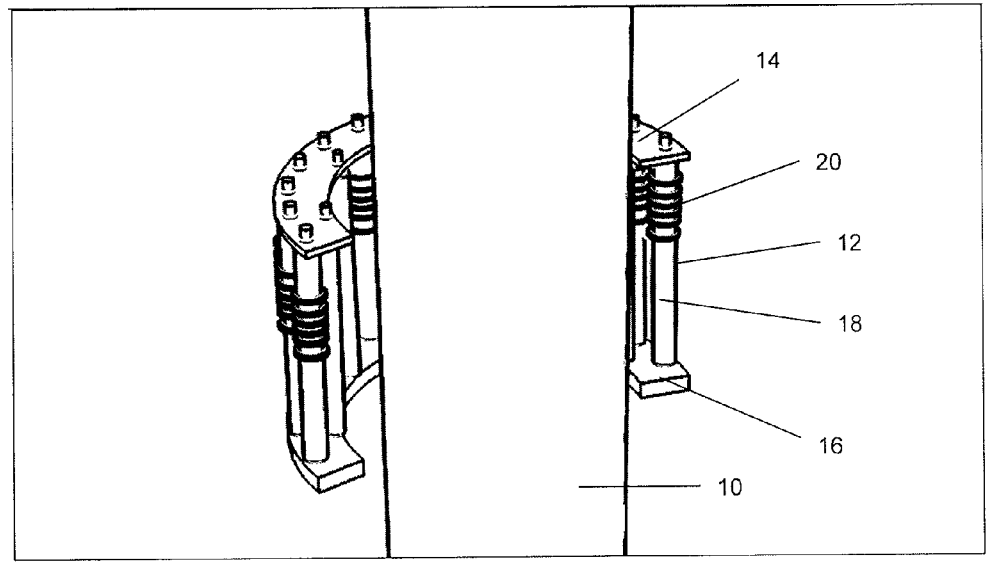
FIG. 2 is a perspective view at a first stage in the repair process.

To now refer to FIG. 2, there is shown one exemplary embodiment of the present invention. In this case a first portion of an application apparatus 12 is placed adjacent to the pipe 10. The application apparatus 12 is an arcuate portion that partially surrounds the pipe 10. It may be for 180 degrees of the pipe as shown, or may be for a lesser segment. The first portion 12 may be substantially rigid or may be in a number of segments that are mutually pivotally attached so that the first portion 12 can be used for pipes of varying diameters. Alternatively, the first portion 12 may be for a pipe 10 of predetermined diameter and may extend around the pipe for 180°. The diameter of the first portion 12 may vary with the diameter of the various pipes.

The first portion 12 has a top plate 14 and a bottom plate 16. Extending between the top plate 14 and bottom plate 16 are a plurality of generally equally spaced guides 18. Rotatably mounted on each of the guides 18 adjacent a top end thereof are a plurality of rollers 20. Instead of a plurality of individual rollers 20, a large, single, roller may be provided or a smaller number of intermediate size rollers. The rollers 20 extend for a portion of the axial length of the guides 18 and are retained adjacent the upper end of the guides 18.

Figure 3:
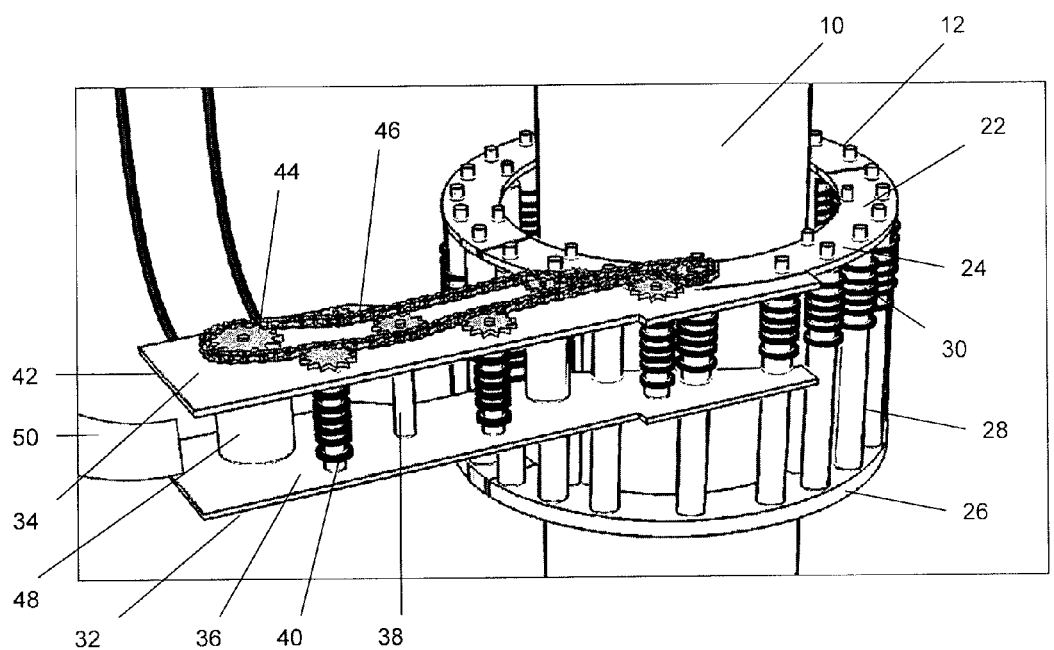
FIG. 3 is a view corresponding to FIG. 2 at a second stage in the repair process.

As shown in FIG. 3 a second portion 22 of the application apparatus is then placed in position and aligned with and secured to or with the first portion 12. The second portion 22 again has a top plate 24 and a bottom plate 26 with guides 28 extending between them and being generally equally spaced. The guides 28 also have rollers 30 adjacent the upper end. In essence, the second portion 22 is substantially identical to the first portion 12.

For varying pipe diameters the second portion 22 may be in a number of segments that are mutually pivotally attached. In that way they can be opened or closed as required to accommodate pipes of varying diameters. Naturally, for large diameter pipes, more than the two portions 12, 22 may be required.

Attached to the second attachment portion 22 is a supply apparatus 32. The supply apparatus 32 comprises a top plate 34 and a bottom plate 36. Extending between the top plate 34 and the bottom plate 36 are a plurality of drive and guide rods 38. On some or all of the rods 38 are rollers 40. Each of the rods 38 is adapted to be driven by a drive system 42 that comprises a sprocket 44 above top plate 34 but securely attached to the upper end of each rod 38. Each sprocket 44 is to drive the rod 38 to rotate about its longitudinal axis. To drive the sprockets a chain 46 is provided. One rod 48 of the rods 38 may contain a drive system (not shown) such as, for example, an electrical air driven motor, a reduction gearbox and a battery. Any suitable drive system may be used. It may be able to operate on its own or may have an external power source (not shown).

The drive system 42 is intended to drive the rods 38 and rollers 40 to enable a strip 50 to be fed through the supply apparatus 42 into the two portions 12, 22 of the application apparatus.

Figure 4:
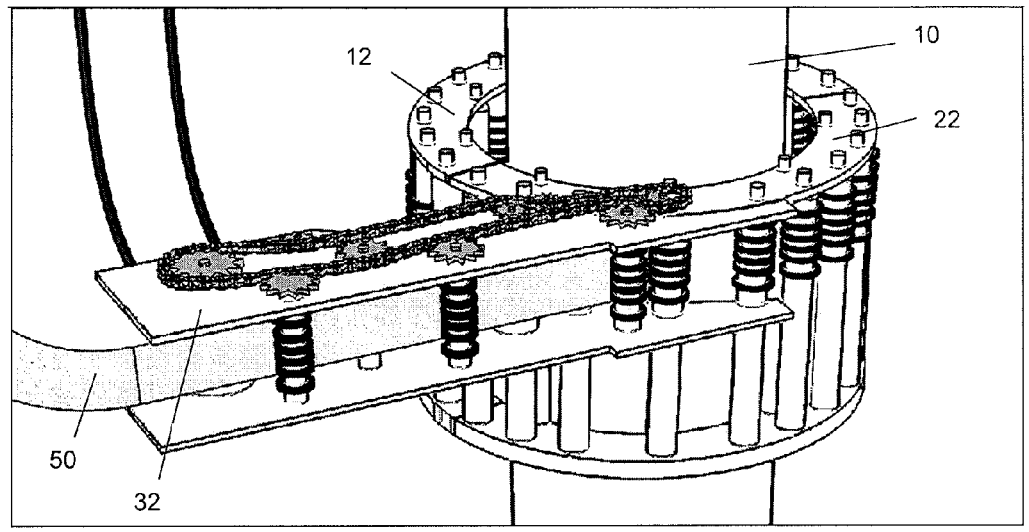
FIG. 4 is a view corresponding to FIGS. 2 and 3 at a third stage in the repair process.
Figure 5:
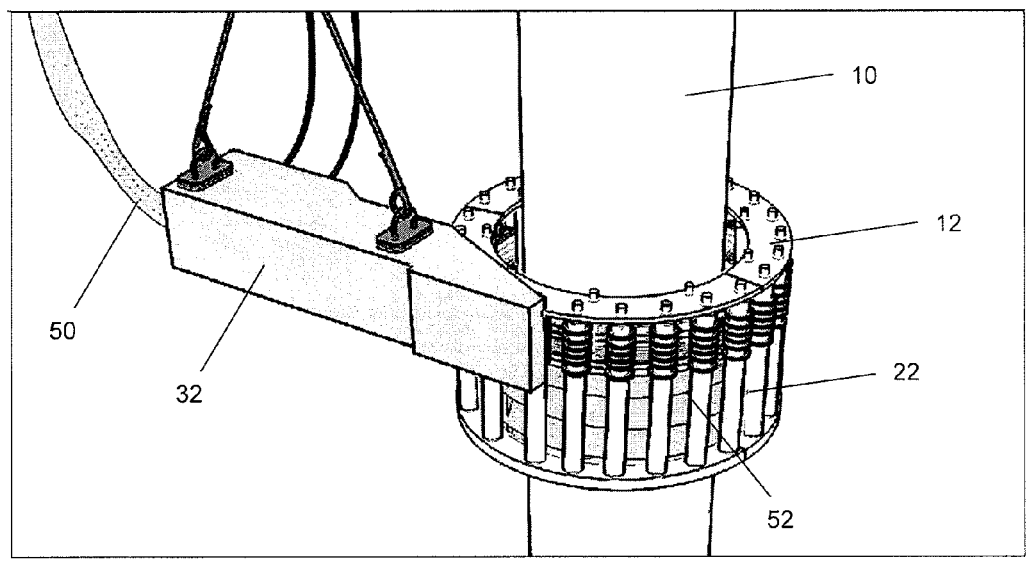
FIG. 5 is a view corresponding to FIGS. 2 to 4 at a fourth stage in the repair process.
Figure 6:
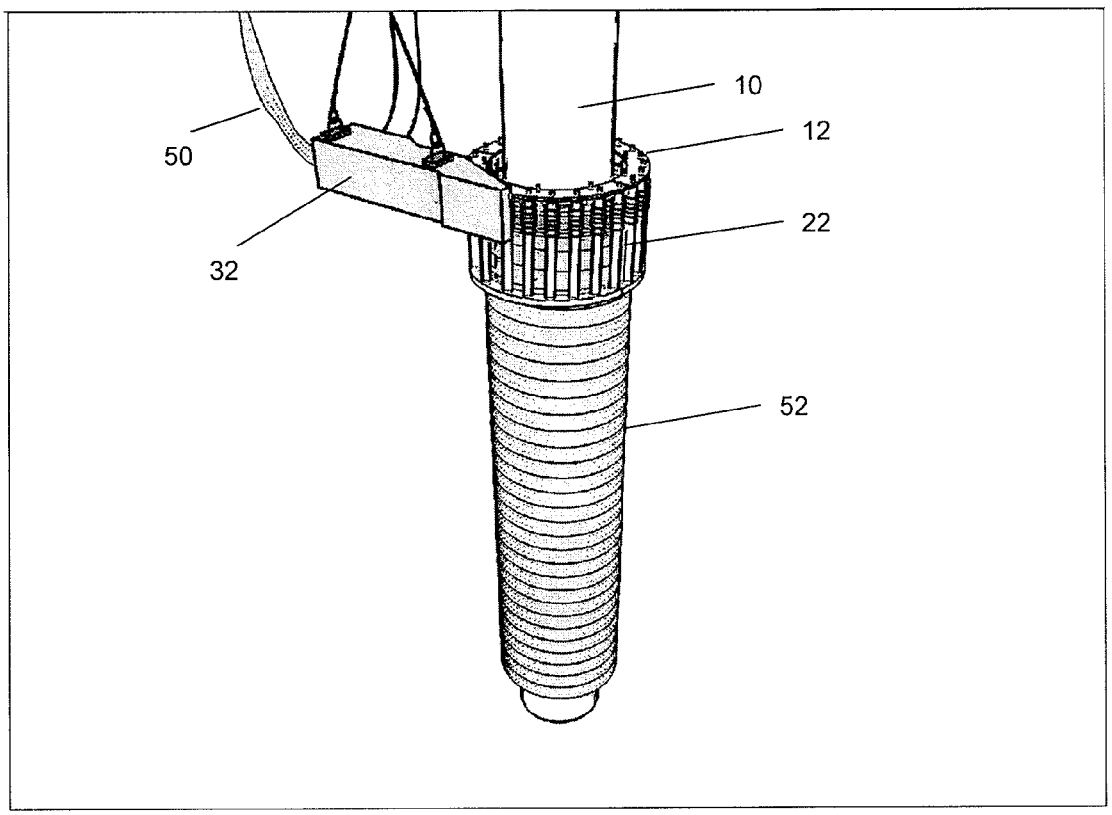
FIG. 6 is a view corresponding to FIGS. 2 to 5 at a fifth stage in the repair process.

The strip 50 is a continuous, fibre reinforced, mechanically sealing, polymer strip. For example, the strip 50 may be a carbon-fibre reinforced HDPE strip. As shown in FIGS. 4 to 6, the strip 50 is fed through the supply apparatus 32 driven by the duct system 42. It feeds between the rods 38, with the rods being located on either side of the longitudinal axis of the supply apparatus 32 in an alternating sequence. The strip 50 is wound around the pipe 10 and forms a continuous, overlapping or mechanically interlocking spiral sleeve 52 around the pipe 10. As the strip 50 forms the spiral sleeve 52, the spiral sleeve 52 will be pulled under gravity from the attachment portions 12, 22. This is because the spiral sleeve 52 is not vertically constrained due to the internal diameter of bottom plate 26 and top plate 24 being equivalent to the external diameter of the spiral sleeve 52. For horizontally disposed pipes, the spiral sleeve 52 can still be formed without gravitational pull because feeding of the strip 50 is actively driven by the drive system 42. The feed of the strip 50 may be such as to form the spiral sleeve 52 by being at an appropriate angle. This would also assist in forming the spiral sleeve 52 when the pipe 10 is not vertical. Therefore, the spiral sleeve 52 of the strip 50 will be wrapped around the pipe 10 forming a sleeve 52 surrounding the damaged portion of pipe 10—that portion requiring repair. The preferably, the spiral sleeve 52 starts from before and extends beyond the damaged portion of the pipe 10 to cater for the transfer of the actual loads to the pipe 10.

Figure 7:
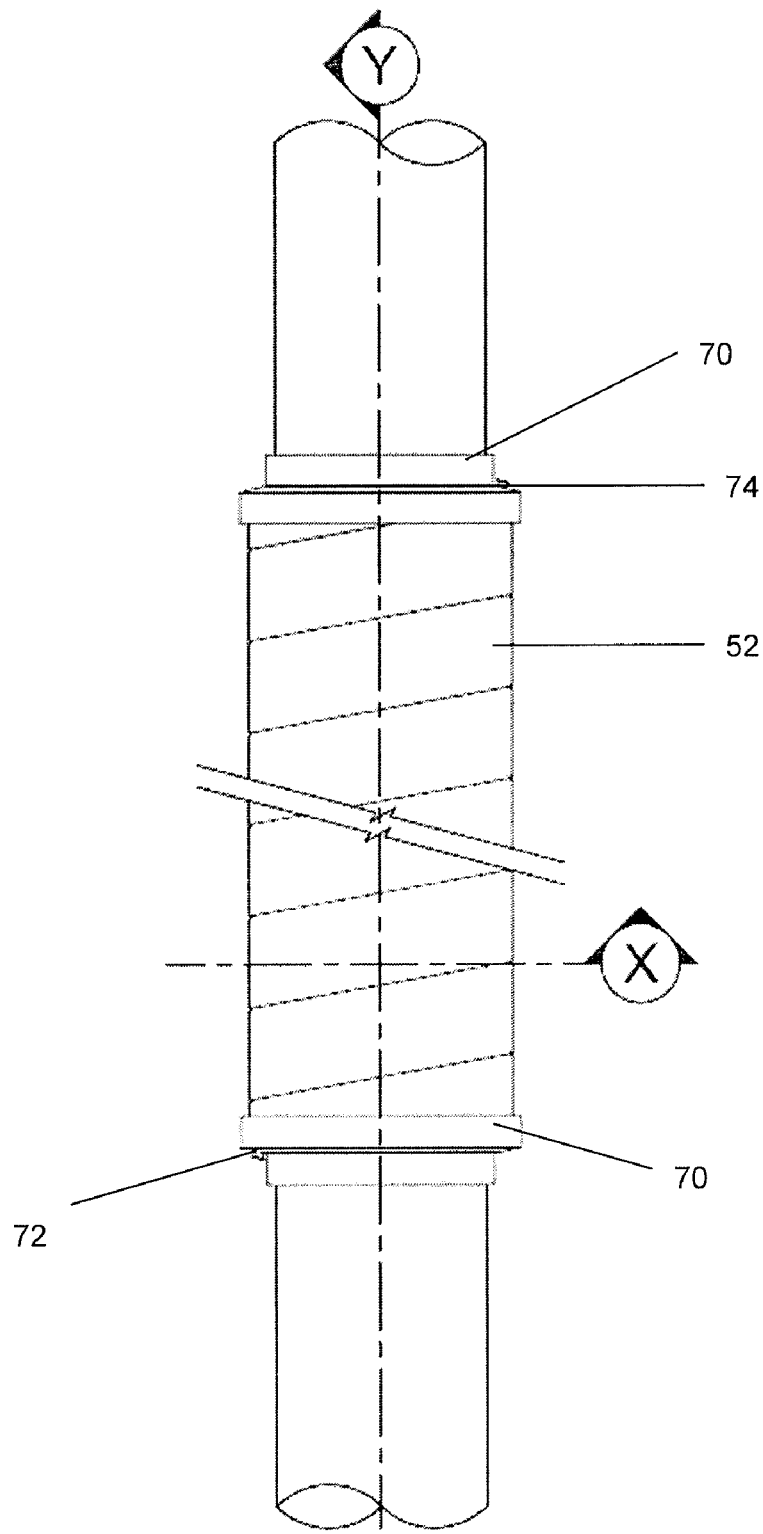
FIG. 7 is a front view of the damaged pipe of FIG. 1 having a spiral sleeve thereon.
Figure 8:
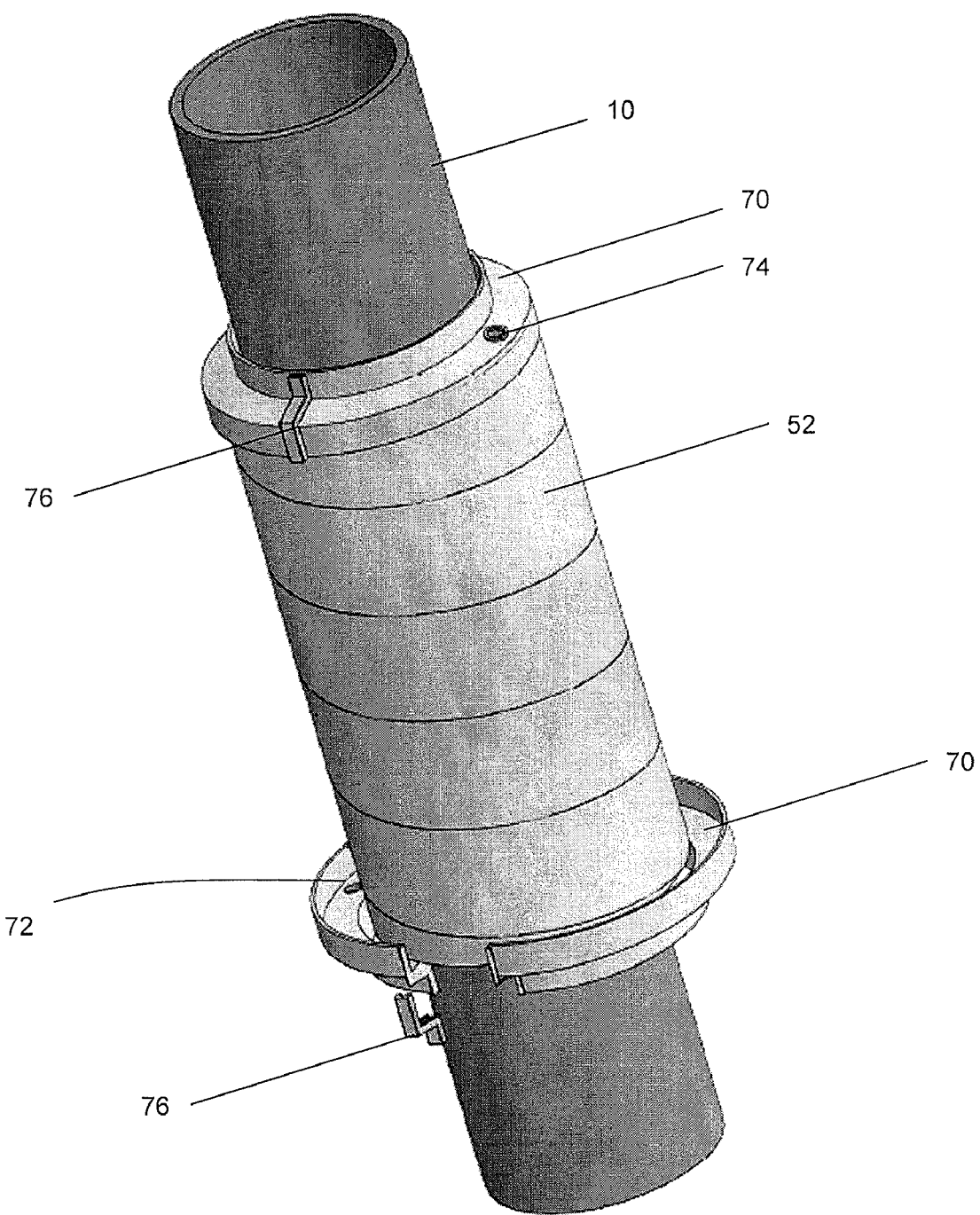
FIG. 8 is a perspective view FIG. 7.
Figure 9:
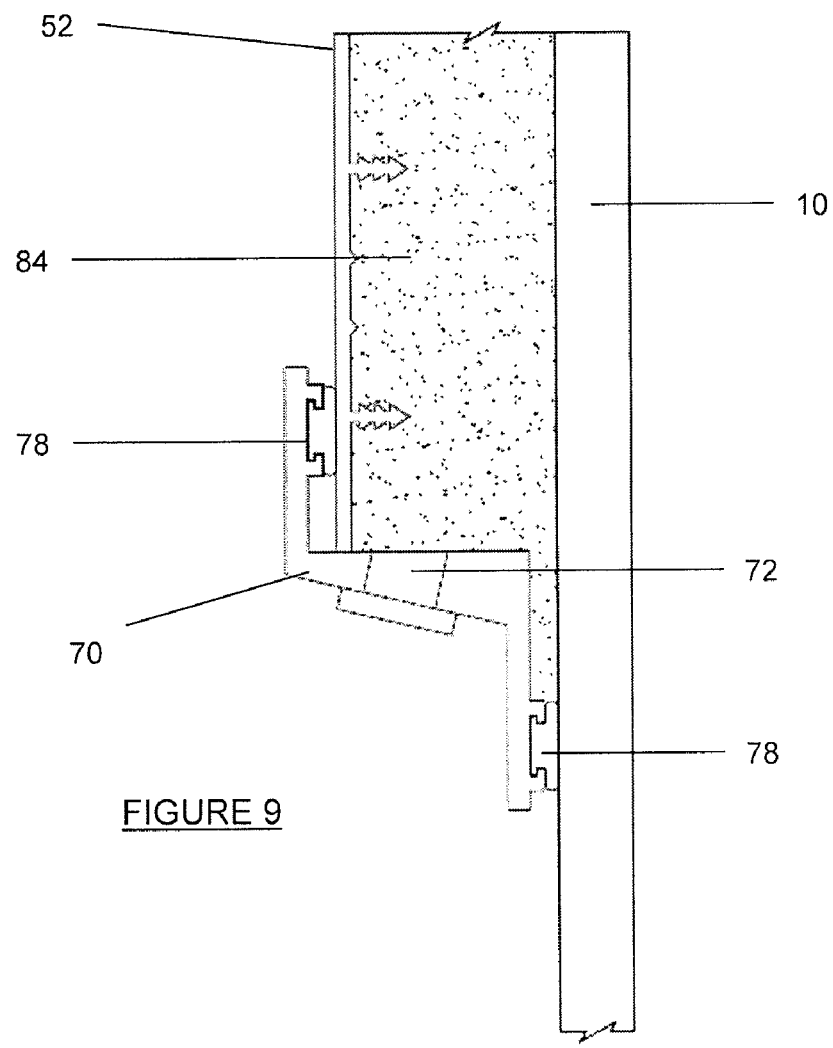
FIG. 9 is a schematic cross-sectional view of an end cap sealed to the spiral sleeve and damaged pipe of FIG. 7.
Figure 10:
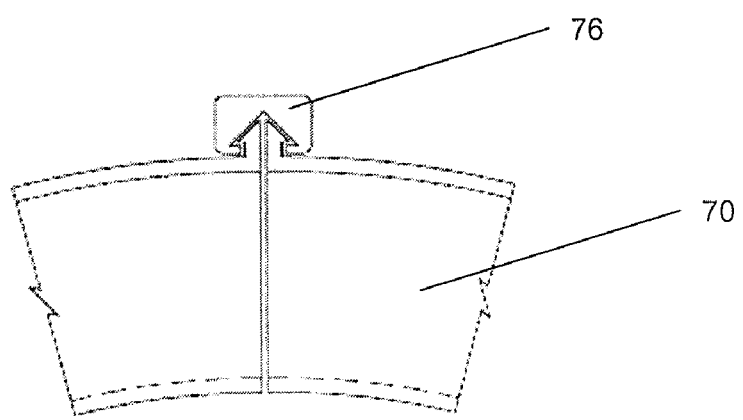
FIG. 10 is a schematic plan view of a connecting portion of the end cap of FIG. 9.

Both ends of the spiral sleeve 52 may be provided with an end cap 70, sealed to the spiral sleeve 52 as shown in FIGS. 7 to 9. The caps are preferably made of PE, and contain an inlet 72 port and an outlet port 74 that may, for example, be in accordance with the U.S. Pat. No. 7,168,743 or the U.S. patent application 2007/0018448 mentioned earlier. Seals such as, for example, "Teflon" seals 78, are preferably provided between the end cap 70 and the spiral sleeve 52, and between the end cap 70 and the pipe 10. The end cap 70 preferably has a general form of a flexible split ring for fitting around the pipe 10, and secured by a connector such as, for example, a PVC or PE connector 76, as shown in plan view in FIG. 10.

Figure 11:
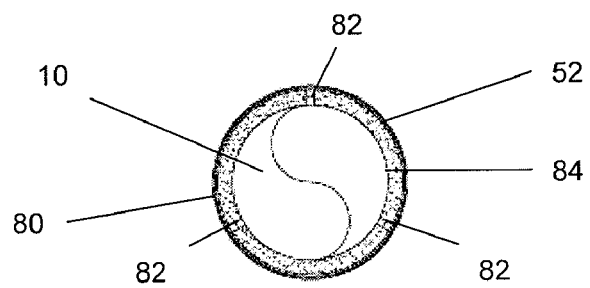
FIG. 11 is a transverse cross-sectional view of the pipe of FIG. 7 at X.
Figure 12:
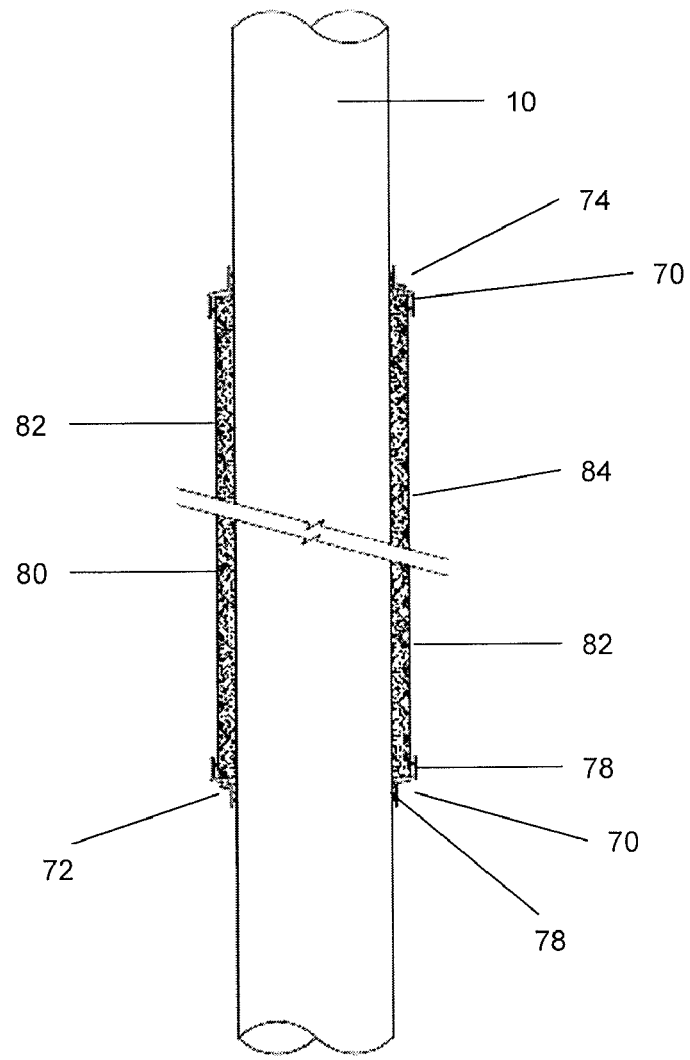
FIG. 12 is a longitudinal cross-sectional view of the pipe of FIG. 8 at Y.
Figure 13:
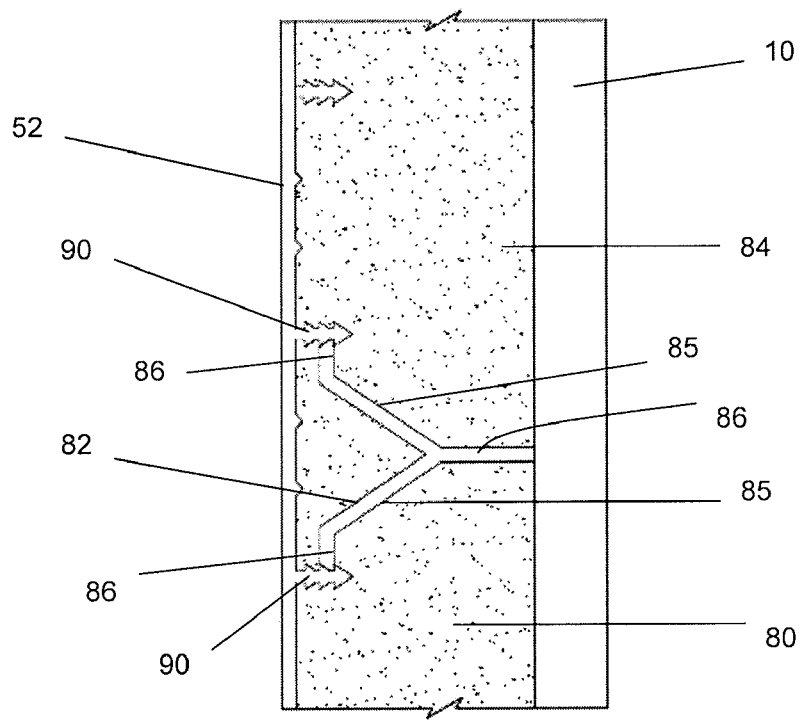
FIG. 13 is a close-up view of the pipe of FIG. 12 showing a spacer.
Figures 14, 15:
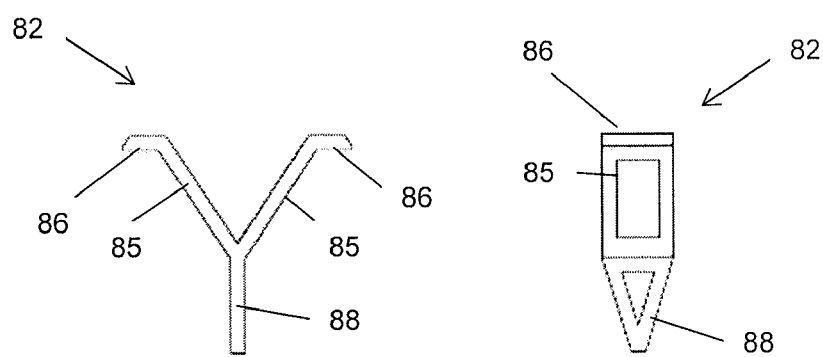
FIG. 14 is a side view of the spacer of FIG. 13.
FIG. 15 is a plan view of the spacer of FIG. 13.

The spiral sleeve 52 is dimensioned in diameter to form an annular chamber 80 between the pipe 10 and the spiral sleeve 52, as shown in FIGS. 11 and 12. That annular chamber 80 will typically range from 25 to 50 mm in radial extent between the outer surface of the pipe 10 and the inner surface of the spiral sleeve 52. The radial size of the annular chamber 80 will depend upon the service condition of the affected area of the pipe 10 such as, for example, dents, wall protrusions, the out of roundness of the pipe, and the volume of the longitudinal reinforcement required. The annular chamber 80 is preferably secured by installing spacers such as, for example, polymer spacers 82, between the spiral sleeve 52 and the pipe 10. Each polymer spacer 82 is preferably Y-shaped with 2 arms 85 and a leg 88. Each arm 85 comprises an angled end 86 for engaging a barbed spike 90 each. The barbed spike 90 preferably has a plurality of tiers of barbs like a miniature Christmas tree. The barbed spikes 90 serve to hold the strip 50 in place. The spacers 82 are preferably manually inserted by clipping each spacer 82 between two barbed spikes 90 during winding of the strip 50 to form the spiral sleeve 52 For a spiral sleeves 52 having a diameter of up to about 20 to 24 inches and a length not exceeding 3 to 4 m, spacers 82 will not be required because the spiral sleeve 52 will be sufficiently rigid) so as to be correctly spaced around the pipe automatically during winding of the strip 50. Installation of the end caps 70 further ensures rigidity of the spiral sleeve 52 and correct spacing of the spiral sleeve 52 from the pipe 10 to form the annular chamber 80.

When the spiral sleeve 52 is complete, water present in the annular chamber 80 will be discharged by means of the application of compressed air or other gas entering through the inlet port 72 and allowing discharge through the outlet port 74. The annular chamber 80 can then be flushed with fresh water and the fresh water removed by use of air or an inert gas. The annular chamber 80 is then filled with a known structural resin or grout 84 in accordance with known techniques providing a bond between the pipe 10 and the spiral sleeve 52 by bonding to both the pipe 10 as well as the spiral sleeve 52. The barbed spikes 90 further anchor the spiral sleeve 52 into the structural resin or grout 84. The attachment portions 12, 20 and supply system 32 can then be removed and the pipe repair completed. Preferably, the attachment portions 12, 20 are removed upon installation of the bottom end cap 70. The spiral sleeve 52 is left in position to provide an external, strengthening and protecting layer over the structural resin or grout 84.

Whilst there has been described in the foregoing description exemplary embodiments, it will be understood by those skilled in the technology concerned that many variations in details of design, construction and/or operation may be made without departing from the present invention.

What is claimed is:

1. A method for applying a continuous strip for providing at least one repair and strengthening to an affected external surface area of a pipe, the method comprising:
   applying an apparatus adjacent to an external surface of a pipe requiring at least one of repair and strengthening that comprises (i) an application apparatus comprising at least two separated portions each having a plurality of rollers adapted for guiding a continuous strip about and over the affected external surface area of the pipe to form a spiral sleeve external to the pipe and extending for at least the axial length of the affected area of the external surface of the pipe; and (ii) a supply apparatus for attachment to at least one of the application apparatus portions, the supply apparatus comprising at least one driving roller for feeding the continuous strip into the at least one application apparatus portion;
   feeding a continuous strip into the at least one application apparatus portion;
   guiding the continuous strip about and over the affected external surface area of the pipe; and
   forming a spiral sleeve external to the pipe and extending for at least the axial length of the affected area of the external surface of the pipe.

2. A method as claimed in claim 1, further comprising cleaning the affected external surface area the pipe to provide a cleaned surface of the pipe surface for the area requiring the at least one of repair and strengthening.

3. A method as claimed in claim 1, wherein the step of forming the spiral sleeve comprises forming the spiral sleeve spaced from the pipe surface to provide an annular chamber between the pipe surface and the spiral sleeve.

4. A method as claimed in claim 3, wherein the continuous strip is a fibre reinforced, mechanically-sealing, polymer strip.

5. A method as claimed in claim 4, wherein continuous strip is a carbon-fibre reinforced HDPE strip.

6. A method as claimed in claim 3, wherein the continuous strip is formed into the spiral sleeve by at least one of: overlapping, and interlocking.

7. A method as claimed in claim 3, wherein the annular chamber is subsequently filled with a filling material for providing a bond between the pipe and the spiral sleeve, the filling material being selected from the group consisting of: a structural resin, and a grout.

8. Apparatus for applying a continuous strip for providing at least one of repair and strengthening to an affected external surface area of a pipe, the apparatus comprising:
   an application apparatus comprising at least two separated portions each having a plurality of rollers adapted for guiding a continuous strip about and over the affected external surface area of the pipe to form a spiral sleeve external to the pipe and extending for at least the axial length of the affected area of the external surface of the pipe; and
   a supply apparatus for attachment to at least one of the application apparatus portions, the supply apparatus comprising at least one driving roller for feeding the continuous strip into the at least one application apparatus portion.

9. Apparatus as claimed in claim 8, wherein each of the at least two portions comprises a top plate and a bottom plate, there being a plurality of generally equally spaced guides extending between the top plate and bottom plate.

10. Apparatus as claimed in claim 9, wherein at least one roller is rotatably mounted on each of the plurality of guides adjacent a top end thereof.

11. Apparatus as claimed in claim 8, wherein the supply apparatus further comprises a supply top plate and a supply bottom plate; and a plurality of drive and guide rods extending between the supply top plate and the supply bottom plate.

12. Apparatus as claimed in claim 11, wherein at least one of the rods comprises rollers.

13. Apparatus as claimed in claim 11, wherein at least one of the rods is adapted to be driven by a drive system.

14. Apparatus as claimed in claim 13, wherein the drive system comprises a sprocket above the supply top plate and securely attached to an upper end of the at least one of the rods for driving the at least one of the rods to a rotate about its longitudinal axis.

15. Apparatus as claimed in claim 13, wherein the drive system is configured to drive the rods and rollers to enable the continuous strip to be fed through the supply apparatus into the at least two portions of the application apparatus.

16. Apparatus as claimed in claim 8, wherein the portions are adapted to be placed around the external surface of the pipe.

17. Apparatus as claimed in claim 8, wherein the portions are adapted to be at least one of (i) aligned with and (ii) secured to or with each other.

18. Apparatus as claimed in claim 8, wherein the application apparatus is adapted to form the sleeve spaced from the external surface of the pipe.

19. Apparatus as claimed in claim 8, wherein the application apparatus is adapted to form an annular chamber between the sleeve and the external surface of the pipe.

20. Apparatus as claimed in claim 8, wherein the portions are substantially identical.

21. Apparatus as claimed in claim 8, wherein the portions each contain multiple segments adapted to be at least one of opened and closed to vary the diameter of the portions.

22. Apparatus as claimed in claim 19, further comprising a plurality of end caps adapted to seal opposing ends of the annular chamber between the sleeve and the external surface of the pipe.

* * * * *